(12) United States Patent
Linder, Jr. et al.

(10) Patent No.: US 10,648,133 B2
(45) Date of Patent: May 12, 2020

(54) TISSUE DUST REDUCTION

(71) Applicant: Ecolab USA Inc., St. Paul, MN (US)

(72) Inventors: Roger Peter Linder, Jr., Suamico, WI (US); Gary Samuel Furman, Jr., St. Charles, IL (US); Robert M. Lowe, Chicago, IL (US); David Castro, DeKalb, IL (US); Robert Anthony Melchiors, Milton, GA (US); Mark A. Billings, Sobieski, WI (US)

(73) Assignee: ECOLAB USA INC., St. Paul, MN (US)

( * ) Notice: Subject to any disclaimer, the term of this patent is extended or adjusted under 35 U.S.C. 154(b) by 22 days.

(21) Appl. No.: 15/594,835

(22) Filed: May 15, 2017

(65) Prior Publication Data

US 2017/0328008 A1     Nov. 16, 2017

Related U.S. Application Data

(60) Provisional application No. 62/336,236, filed on May 13, 2016.

(51) Int. Cl.
*D21H 21/20*     (2006.01)
*D21H 17/37*     (2006.01)
(Continued)

(52) U.S. Cl.
CPC .............. *D21H 21/20* (2013.01); *B05D 1/02* (2013.01); *C08F 2/02* (2013.01); *C08F 220/56* (2013.01);
(Continued)

(58) Field of Classification Search
CPC .... D21H 17/37; D21H 17/455; D21H 17/375; D21H 21/18; D21H 21/20; D21H 17/33;
(Continued)

(56) References Cited

U.S. PATENT DOCUMENTS 2,059,465 A * 11/1936 Kress ................... D21H 17/22
                                                              106/144.1
2,601,597 A     6/1952 Daniel, Jr. et al.
(Continued)

FOREIGN PATENT DOCUMENTS

CA     2176898 C     10/2006
DE     4426620 A1    2/1995
(Continued)

OTHER PUBLICATIONS

Anon, "Daily-use paper project at Fujian HengLi to enter production," *China Pap. Ind. News*, vol. 1, No. 13, p. 2 (May 30, 2006).
(Continued)

*Primary Examiner* — Jose A Fortuna
(74) *Attorney, Agent, or Firm* — Eric D. Babych; Barnes & Thornburg LLP (57) ABSTRACT

Methods of reducing paper dusting in a papermaking process, and a low dusting tissue having increased strength are provided. Application of a polymer comprising at least one amine-containing vinylic or allylic monomer to at least one surface of a paper web during the papermaking process reduces the dusting tendency of the paper, and increases both the wet and dry strength of the paper product.

11 Claims, 4 Drawing Sheets

(51) Int. Cl.
 *D21H 21/02* (2006.01)
 *D21H 23/24* (2006.01)
 *D21H 17/41* (2006.01)
 *B05D 1/02* (2006.01)
 *C08F 2/02* (2006.01)
 *C08F 220/56* (2006.01)
 *D21H 21/10* (2006.01)
 *D21H 21/18* (2006.01)

(52) U.S. Cl.
 CPC ........... *D21H 17/37* (2013.01); *D21H 17/375* (2013.01); *D21H 17/41* (2013.01); *D21H 21/02* (2013.01); *D21H 21/10* (2013.01); *D21H 21/18* (2013.01); *D21H 23/24* (2013.01)

(58) Field of Classification Search
 CPC ........ D21H 21/10; D21H 23/24; D21H 21/02; D21H 21/16; C08F 220/56; C08F 2/02; B05D 1/02
 See application file for complete search history.

(56) References Cited

U.S. PATENT DOCUMENTS

| | | | |
|---|---|---|---|
| 2,765,229 A * | 10/1956 | McLaughlin | D21H 17/43 162/168.1 |
| 2,982,749 A | 5/1961 | Friedrich et al. | |
| 3,102,064 A | 8/1963 | Wurzburg et al. | |
| 3,233,962 A | 2/1966 | Nelson | |
| 3,234,076 A | 2/1966 | Goldsmith | |
| 3,284,393 A | 11/1966 | Vanderhoff et al. | |
| 3,409,500 A | 11/1968 | Strazdins et al. | |
| 3,507,847 A * | 4/1970 | Coscia | D21H 17/37 162/168.1 |
| 3,555,932 A | 1/1971 | Schwerdhöfer | |
| 3,556,932 A * | 1/1971 | Coscia et al. | C08B 31/125 162/166 |
| 3,734,873 A | 5/1973 | Anderson et al. | |
| 3,772,076 A | 11/1973 | Keim | |
| 3,821,069 A | 6/1974 | Wurzburg | |
| RE28,474 E | 7/1975 | Anderson et al. | |
| RE28,576 E | 10/1975 | Anderson et al. | |
| 3,951,921 A * | 4/1976 | Espy | C08G 69/48 525/430 |
| 3,968,005 A | 7/1976 | Wurzburg | |
| 4,040,900 A | 8/1977 | Mazzarella et al. | |
| 4,210,489 A * | 7/1980 | Markofsky | D21H 17/43 162/164.3 |
| 4,493,659 A | 1/1985 | Iwashita | |
| 4,533,434 A | 8/1985 | Yoshioka et al. | |
| 4,603,176 A | 7/1986 | Bjorkquist et al. | |
| 4,605,702 A | 8/1986 | Guerro et al. | |
| 4,657,946 A | 4/1987 | Rende et al. | |
| 4,915,786 A | 4/1990 | Sweeney | |
| 4,919,821 A | 4/1990 | Fong et al. | |
| 4,929,655 A | 5/1990 | Takeda et al. | |
| 4,956,399 A | 9/1990 | Kozakiewicz et al. | |
| 5,006,590 A | 4/1991 | Takeda et al. | |
| 5,147,908 A | 9/1992 | Floyd et al. | |
| 5,179,150 A * | 1/1993 | Furman, Jr. | C08L 29/04 524/376 |
| 5,187,219 A * | 2/1993 | Furman, Jr. | C08F 8/00 524/377 |
| 5,223,092 A * | 6/1993 | Grinnell | D21F 11/006 162/109 |
| 5,271,806 A * | 12/1993 | Deutsch | D21H 17/00 162/135 |
| 5,281,307 A | 1/1994 | Smigo et al. | |
| 5,324,792 A | 6/1994 | Ford | |
| 5,374,334 A * | 12/1994 | Sommese | D21H 17/36 162/111 |
| 5,438,087 A | 8/1995 | Ikeda et al. | |
| 5,474,856 A | 12/1995 | Tamagawa et al. | |
| 5,501,774 A | 3/1996 | Burke | |
| 5,571,380 A | 11/1996 | Fallon | |
| 5,597,858 A | 1/1997 | Ramesh et al. | |
| 5,597,859 A | 1/1997 | Hurlock et al. | |
| 5,605,970 A | 2/1997 | Selvarajan | |
| 5,654,198 A | 8/1997 | Carrier et al. | |
| 5,674,362 A | 10/1997 | Underwood et al. | |
| 5,837,776 A | 11/1998 | Selvarajan et al. | |
| 5,865,951 A | 2/1999 | Kawakami et al. | |
| 5,938,937 A | 8/1999 | Sparapany et al. | |
| 5,961,782 A | 10/1999 | Luu et al. | |
| 5,985,992 A | 11/1999 | Chen | |
| 6,013,705 A | 1/2000 | Chen et al. | |
| 6,013,708 A | 1/2000 | Mallon et al. | |
| 6,027,611 A * | 2/2000 | McFarland | B32B 29/00 162/127 |
| 6,077,394 A | 6/2000 | Spence et al. | |
| 6,083,348 A | 7/2000 | Auhorn et al. | |
| 6,153,049 A * | 11/2000 | Croft | D21C 5/022 162/166 |
| 6,190,499 B1 | 2/2001 | Oriaran et al. | |
| 6,238,519 B1 * | 5/2001 | Jones | D21H 21/22 162/111 |
| 6,238,521 B1 | 5/2001 | Shing et al. | |
| 6,245,874 B1 | 6/2001 | Staib et al. | |
| 6,315,866 B1 | 11/2001 | Sanchez | |
| 6,348,132 B1 | 2/2002 | Zhang et al. | |
| 6,426,383 B1 | 7/2002 | Fong et al. | |
| 6,472,487 B2 | 10/2002 | Schroeder et al. | |
| 6,491,790 B1 | 12/2002 | Proverb et al. | |
| 6,592,718 B1 | 7/2003 | Wong Shing et al. | |
| 6,610,209 B1 | 8/2003 | Sommese et al. | |
| 6,699,359 B1 | 3/2004 | Luu et al. | |
| 6,743,335 B2 | 6/2004 | Proverb et al. | |
| 6,746,542 B1 | 6/2004 | Lorencak et al. | |
| 6,787,574 B1 | 9/2004 | Anderson et al. | |
| 6,808,595 B1 * | 10/2004 | Burns | D21H 27/38 162/129 |
| 6,815,497 B1 | 11/2004 | Luu et al. | |
| 6,939,443 B2 | 9/2005 | Ryan et al. | |
| 7,034,087 B2 | 4/2006 | Hagiopol et al. | |
| 7,119,148 B2 | 10/2006 | Hagiopol et al. | |
| 7,125,469 B2 | 10/2006 | Barcus et al. | |
| 7,125,695 B2 | 10/2006 | Schellenberger et al. | |
| 7,323,510 B2 | 1/2008 | Fischer et al. | |
| 7,455,751 B2 | 11/2008 | Ward et al. | |
| 7,488,403 B2 | 2/2009 | Hagiopol et al. | |
| 7,550,060 B2 | 6/2009 | Jacobson et al. | |
| 7,615,135 B2 | 11/2009 | Harrington et al. | |
| 7,641,766 B2 | 1/2010 | St. John et al. | |
| 7,641,776 B2 | 1/2010 | Nagar et al. | |
| 7,683,121 B2 | 3/2010 | Wei et al. | |
| 7,740,743 B2 | 6/2010 | Singh et al. | |
| 7,794,565 B2 | 9/2010 | Shannon et al. | |
| 7,863,395 B2 | 1/2011 | Hagiopol et al. | |
| 7,897,013 B2 | 3/2011 | Hagiopol et al. | |
| 7,914,646 B2 | 3/2011 | Duggirala et al. | |
| 7,938,934 B2 | 5/2011 | Todorovic et al. | |
| 7,972,478 B2 | 7/2011 | Hund et al. | |
| 8,025,924 B2 | 9/2011 | Ohira et al. | |
| 8,070,914 B2 | 12/2011 | Ryan et al. | |
| 8,088,213 B2 | 1/2012 | Cheng et al. | |
| 8,088,250 B2 | 1/2012 | Cheng et al. | |
| 8,288,502 B2 | 10/2012 | Bode et al. | |
| 8,349,134 B2 | 1/2013 | Esser et al. | |
| 8,382,947 B2 | 2/2013 | Skaggs et al. | |
| 8,404,083 B2 | 3/2013 | Haehnle et al. | |
| 8,414,739 B2 | 4/2013 | Kimura et al. | |
| 8,425,724 B2 | 4/2013 | Ryan et al. | |
| 8,444,818 B2 | 5/2013 | Sutman et al. | |
| 8,454,798 B2 | 6/2013 | Ban et al. | |
| 8,465,623 B2 | 6/2013 | Zhao et al. | |
| 8,636,875 B2 | 1/2014 | McKay | |
| 8,647,472 B2 | 2/2014 | Cheng et al. | |
| 8,696,869 B2 | 4/2014 | Borkar et al. | |
| 8,709,207 B2 * | 4/2014 | Grimm | D21H 17/06 162/164.1 |
| 8,709,208 B2 | 4/2014 | Zhao et al. | |
| RE44,936 E | 6/2014 | St. John et al. | |
| 8,747,617 B2 | 6/2014 | Cheng et al. | |

(56) References Cited

U.S. PATENT DOCUMENTS

| | | | |
|---|---|---|---|
| 8,753,480 B2 | 6/2014 | Bode et al. | |
| 8,840,759 B2 | 9/2014 | Benz et al. | |
| 8,852,400 B2* | 10/2014 | St. John | D21H 17/56 |
| | | | 162/168.3 |
| 8,882,964 B2 | 11/2014 | Zhao et al. | |
| 8,894,817 B1 | 11/2014 | Cheng et al. | |
| 8,920,606 B2 | 12/2014 | Wright | |
| 8,999,111 B2 | 4/2015 | Castro et al. | |
| 9,011,643 B2 | 4/2015 | Gu et al. | |
| 9,034,145 B2 | 5/2015 | Castro et al. | |
| 9,051,687 B2 | 6/2015 | Esser et al. | |
| 9,145,646 B2 | 9/2015 | Benz et al. | |
| 9,328,462 B2 | 5/2016 | Chen et al. | |
| 9,840,810 B2* | 12/2017 | Castro | D21H 17/375 |
| 2002/0045704 A1* | 4/2002 | Luu | B31F 1/12 |
| | | | 525/60 |
| 2002/0139500 A1* | 10/2002 | Runge | D21C 9/002 |
| | | | 162/135 |
| 2003/0056917 A1* | 3/2003 | Jimenez | D21H 23/26 |
| | | | 162/158 |
| 2003/0224945 A1 | 12/2003 | Twu et al. | |
| 2004/0060677 A1 | 4/2004 | Huang | |
| 2004/0084162 A1* | 5/2004 | Shannon | D21H 17/455 |
| | | | 162/109 |
| 2006/0142535 A1 | 6/2006 | Cyr et al. | |
| 2006/0201645 A1 | 9/2006 | Ito | |
| 2007/0000630 A1 | 1/2007 | Hassler et al. | |
| 2008/0149287 A1 | 6/2008 | Hagiopol et al. | |
| 2008/0196851 A1 | 8/2008 | Hund et al. | |
| 2008/0277084 A1 | 11/2008 | Denowski et al. | |
| 2008/0308242 A1 | 12/2008 | Lu et al. | |
| 2009/0107644 A1 | 4/2009 | Cowman et al. | |
| 2009/0145566 A1 | 6/2009 | Esser et al. | |
| 2009/0165978 A1 | 7/2009 | Hagiopol et al. | |
| 2009/0281212 A1 | 11/2009 | Pawlowska et al. | |
| 2010/0018660 A1* | 1/2010 | Varnell | D21H 17/17 |
| | | | 162/164.7 |
| 2010/0193147 A1 | 8/2010 | Ryan et al. | |
| 2011/0083821 A1 | 4/2011 | Wright | |
| 2011/0132559 A1 | 6/2011 | Haehnle et al. | |
| 2011/0146925 A1 | 6/2011 | Bode et al. | |
| 2011/0155339 A1* | 6/2011 | Brungardt | D21H 21/18 |
| | | | 162/164.6 |
| 2012/0035306 A1 | 2/2012 | Ryan et al. | |
| 2012/0073773 A1 | 3/2012 | Jehn-Rendu et al. | |
| 2012/0073774 A1 | 3/2012 | Jehn-Rendu et al. | |
| 2012/0103546 A1 | 5/2012 | Maniere | |
| 2012/0103547 A1 | 5/2012 | Grimm et al. | |
| 2012/0111517 A1 | 5/2012 | Borkar et al. | |
| 2012/0186764 A1 | 7/2012 | McKay | |
| 2013/0081771 A1 | 4/2013 | Luo et al. | |
| 2013/0133847 A1 | 5/2013 | Zhao et al. | |
| 2013/0139985 A1 | 6/2013 | Wright | |
| 2013/0160959 A1 | 6/2013 | Rosencrance et al. | |
| 2013/0192782 A1 | 8/2013 | Benz et al. | |
| 2013/0306261 A1 | 11/2013 | Zhao et al. | |
| 2014/0053996 A1 | 2/2014 | Esser et al. | |
| 2014/0060763 A1 | 3/2014 | Bode et al. | |
| 2014/0130994 A1 | 5/2014 | St. John et al. | |
| 2014/0182799 A1 | 7/2014 | Castro et al. | |
| 2014/0262091 A1 | 9/2014 | Lu et al. | |
| 2014/0284011 A1 | 9/2014 | Krapsch et al. | |
| 2014/0336314 A1 | 11/2014 | Benz et al. | |
| 2015/0020988 A1 | 1/2015 | St. John et al. | |
| 2015/0041088 A1 | 2/2015 | Castro et al. | |
| 2015/0041089 A1 | 2/2015 | Castro et al. | |
| 2015/0041092 A1 | 2/2015 | Hietaniemi et al. | |
| 2015/0059998 A1 | 3/2015 | Zhao et al. | |
| 2015/0176206 A1 | 6/2015 | Chen et al. | |
| 2015/0191875 A1 | 7/2015 | Esser et al. | |
| 2015/0197893 A1 | 7/2015 | Cheng et al. | |
| 2015/0204019 A1 | 7/2015 | Wright | |
| 2015/0299961 A1 | 10/2015 | Borkar et al. | |
| 2016/0097160 A1* | 4/2016 | Castro | D21H 17/375 |
| | | | 162/164.6 |
| 2016/0097161 A1 | 4/2016 | Benz et al. | |
| 2016/0298297 A1* | 10/2016 | Borkar | D21H 21/18 |
| 2017/0328008 A1* | 11/2017 | Linder, Jr. | C08F 2/02 |
| 2019/0031802 A1* | 1/2019 | Gu | C08F 224/00 |

FOREIGN PATENT DOCUMENTS

| | | | |
|---|---|---|---|
| EP | 0151994 A2 | 8/1985 | |
| EP | 0183466 B1 | 6/1986 | |
| EP | 0444788 A1 * | 9/1991 | D21C 5/022 |
| EP | 0630909 B1 | 12/1994 | |
| EP | 0657478 A2 | 6/1995 | |
| EP | 1195259 A2 | 4/2002 | |
| EP | 1579071 B1 | 7/2008 | |
| JP | 05-247883 A | 9/1993 | |
| JP | H06-299494 A | 10/1994 | |
| JP | 2005-001197 A | 1/2005 | |
| JP | 2008-049688 A | 3/2008 | |
| JP | 2012-107356 A | 6/2012 | |
| WO | WO 97/05330 A1 | 2/1997 | |
| WO | WO 97/10387 A1 | 3/1997 | |
| WO | WO-0000698 A1 * | 1/2000 | B32B 7/00 |
| WO | WO 00/11053 A1 | 3/2000 | |
| WO | WO 2004/061235 A1 | 7/2004 | |
| WO | WO 2008/028865 A2 | 3/2008 | |
| WO | WO 2012/007364 A1 | 1/2012 | |
| WO | WO 2014/078102 A1 | 5/2014 | |
| WO | WO-2017197380 A1 * | 11/2017 | C08F 2/02 |

OTHER PUBLICATIONS

Anon, "An Innovative Approach to Fibre Recovery and Ash, Fines and Colloidals Control for Increased Water System Closure," *TAPPSA Journal*, pp. 27-32 (Sep. 2009).

Brown, "New Simplified Technology for On-Line Measurement on Tissue Machines," *Process Control News (for the Pulp and Paper Industries)*, vol. 21, No. 6, pp. 8-9 (Jun. 2001).

Devillers et al, "Fines management for tissue machines" *International Paperwork (IPW)*, No. 1-2, pp. 15-18 (Jan.-Feb. 2014).

Ecolab Global Knowledge Services, Literature Search Report #10261, 38 pp. (Aug. 21, 2015).

European Patent Office, International Search Report in International Patent Application No. PCT/US2017/032616, dated Aug. 7, 2017, 4 pp.

European Patent Office, Written Opinion in Internationai Patent Application No. PCT/US2017/032616, dated Aug. 7, 2017, 5 pp.

Farley et al., "Sizing With Alkenyl Succinic Anhydridge," *The Sizing of Paper*, $2^{nd}$ Ed., Atlanta, GA: TAPPI Press, pp. 51-62 (1989).

Farley et al., "Glyoxalated Polyacrylamide Resin," *Wet-Strength Resins and Their Application*, Chapter 3, Atlanta, GA:TAPPI Press, pp. 45-61 (1994).

Friberg et al., "Emulsions," *Encyclopedia of Chemical Technology*, $41^{th}$ Ed., vol. 9, pp. 393-413 (Dec. 4, 2000).

Gruszka et al., "Testing de-ashing of tissue paper through fractionated de-crilling of selected recycled pulp grades;" *Przeglad Pap. (Polish Paper Review)*, vol. 69, No. 2, pp. 131-138 (2013).

Hughson et al. "Characterization of Assessment of Dermal and Inhalable Nickel Exposures in Nickel Production and Primary User Industries," *Ann. Occup. Hyg.*, vol. 54 , No. 1, pp. 8-22 (2010).

Hunkeler et al., "Mechanism, kinetics and modelling of the inverse-microsuspension homopolymerization of acrylamide," *Polymer*, vol. 30, No. 1, pp. 127-142 (Jan. 1989).

Hunkeler et al., "Mechanism, kinetics and modelling of inverse-micorsuspension polymerization: 2. Copolymerization of acrylamide with quaternary ammonium cationic monomers," *Polymer*, vol. 32, No. 14, pp. 2626-2640 (1991).

Kraus et al., "Respiratory symptoms and diseases among workers in the soft tissue producing industry," *Occup. Environ. Med.*, vol. 59, No. 12, pp. 830-835 (2002).

Nalco Chemical Company, Hercobond 1000 Product Analysis, 1 pg. (Feb. 25, 2002).

(56) References Cited

OTHER PUBLICATIONS

Nalco Chemical Company, Parez 631 NC Product Analysis, 20 pp. (Aug. 5, 1999).
Panda, "Approaches to high-yield pulping of mechanical pulp types," *Proceedings of the International Workshop on Small Scale Chemical Recovery, High Yield Pulping, and Effluent Treatment*, 15 pp. (1991).
Peters, "Optimised fibre yield arid stook mixture," *Wochenbl. Papierfabr.*, vol. 140, No. 7, pp. 545-546 (Jul. 2012).
Roy et al., "Effect of Nonfibrous Tissue on the Papermaking Properties of Bagasse and Straws," *IPPTA Convention Issue—Annual General Meeting & Seminar on Non-Wood Fibrous Raw Material Pulping and Paper Making*, pp. 49-55 (1993-1994).
Sheridan, et al., "Dust—No Longer an Issue for Tissue," *Paper Technology*, vol. 46, No. 5, pp. 33-38 (Jun. 2005).
Sheridan et al., "Dust—No Longer an Issue for Tissue," *Tissue World 2005 Conference—The 7$^{th}$ International Conference and Exhibition for the Tissue Business—Preprints*, 11 pp. (Apr. 2005).
Snook, "Non-fibrous Additives to Papermaking Stock," *Handbook for Pulp and Paper Technologies*, Chapter 15, pp. 220-227 (1992).
Springer et al., "The effect of fibrous fines on tissue properties," *Tappi Journal*, vol. 71, No. 2, pp. 99-102 (1988).
St. John, "Ondec-Nalco Technical Exchange," 5 pp. (Jun. 27, 2002).
Tatum, "Characterization of Particulate Matter in Workplace Atmospheres of Paper Making and Converting Operations," *NCASI Technical Bulletin*, No. 873, 36 pp. (Mar. 2004).
Williamson, "Cost-effective automation at SCA," *Paper360*, vol. 5, No. 2 pp. 16-17 (Mar.-Apr. 2010).

\* cited by examiner

TISSUE DUST REDUCTION

This application is a nonprovisional application claiming the benefit of U.S. Provisional Patent Application No. 62/336,236, filed May 13, 2016, the disclosure of which is incorporated by reference herein in its entirety.

FIELD OF INVENTION

The invention relates to compositions and methods for reducing excessive dusting during the manufacture of paper products.

BACKGROUND OF THE INVENTION

Papermaking involves the preparation of a paper product from an aqueous suspension of cellulosic fibers by forming a mat of interwoven fibers and removal of water from the mat by various dewatering methods including free drainage, vacuum, pressing, and evaporative drying. A problem that is observed during the papermaking process and for the finished paper is the tendency for paper to release fiber and filler particles from the paper surface, leading to the formation of lint and dust. Excessive dusting can pose problems during the manufacture of tissue products, and can result in runnability and quality issues on papermaking machines. Moreover, dust and lint accumulation can create a fire hazard. In papermaking, there is also the potential for workers to be exposed to paper dust. Regular exposure to high levels of dust can affect the respiratory system and cause illness.

Tissue paper is a lightweight paper that can be used to prepare absorbent products such as bath tissue, facial tissue, and absorbent towels. Tissue paper is generally prepared by forming a wet web of wood pulp and transferring the web to a heated cylinder called a Yankee dryer to reduce the moisture content. The tissue paper is subjected to a creping process where the paper is scraped off of the Yankee Dryer by contacting a blade against the dryer. Creping makes the tissue sheets flexible, soft, and absorbent. Ideally, the resulting tissue should have high softness, while also having sufficient strength and resistance to dusting.

The creping process typically suffers from dusting issues, which occurs during contact of the creping blade with the tissue sheet. Loose dust particles are generated when mechanical force is applied to tissue paper, and is more pronounced in processes where tissue sheets are weak or loosely bonded. As generally observed in papermaking processes, the surface and fine fibers of the tissue are dispersed into air and settles on papermaking equipment. High dusting and linting tissue can create a nuisance for consumers with regard to cleanliness of the tissue/towel dispenser and surrounding areas.

A number of methods are used to reduce linting and dusting. Air jets as well as vacuum systems positioned near the papermaking process have been used to remove lint and dust released from the paper substrate, but these methods are generally energy inefficient and do not address dust generated by handling of the finished paper products.

Tissue dusting and linting remain a significant problem in the field and there continues to be a need for new strategies for dust reduction in tissue making.

BRIEF SUMMARY OF THE INVENTION

In an embodiment, the invention provides a method for reducing dust in a tissue making process. The method comprises applying a polymer comprising at least one amine-containing vinylic or allylic monomer to the surface of a tissue web. In certain preferred embodiments, the polymer is applied to the surface of the tissue web prior to drying the tissue web.

In another embodiment, the invention provides a low dust tissue product. The tissue product comprises cellulosic fibers and a polymer comprising at least one amine-containing vinylic or allylic monomer. The polymer is disposed on at least one surface of the tissue product.

DETAILED DESCRIPTION OF THE INVENTION

The following definitions are provided to determine how terms used in this application, and in particular, how the claims are to be construed. The organization of the definitions is for convenience only and is not intended to limit any of the definitions to any particular category.

"Acrylamide monomer" means a monomer of formula wherein $R^1$ is selected from the group consisting of H, $C_1$-$C_{16}$ alkyl, aryl, arylalkyl, $C_2$-$C_{16}$ alkenyl, $C_2$-$C_{16}$ alkynyl, heteroaryl, alkylheteroaryl, $C_3$-$C_8$ cycloalkyl, and halogen; and $R^2$ is selected from the group consisting of hydrogen, $C_1$-$C_{16}$ alkyl, aryl, arylalkyl, $C_2$-$C_{16}$ alkenyl, $C_2$-$C_{16}$ alkynyl, heteroaryl, alkylheteroaryl, and hydroxyl;

"Aldehyde-functionalized polymer" refers to a polymer that results from a reaction between a polymer comprising at least one amide and/or amino group with an aldehyde. An "aldehyde" means a compound containing one or more aldehyde (—CHO) groups, where the aldehyde groups are capable of reacting with the amine group(s) of a polymer comprising an amine group as described herein. Representative aldehydes include formaldehyde, paraformaldehyde, glutaraldehyde, glyoxal, and the like;

"Amine-containing vinylic or allylic monomer" refers to compounds comprising both a nitrogen atom and a vinyl, allyl, or acrylic group. The amine-containing vinylic or allylic monomer generally comprises a primary or secondary amine. Nonlimiting examples include acrylamide compounds and diallylamine compounds;

"Paper" refers to sheet-like masses and molded products made from cellulosic materials which may be derived from natural sources as well as from synthetics. In addition, papers made from combinations of cellulosic and synthetic materials are applicable herein;

"Papermaking process" means a method of making paper and paperboard products from pulp comprising forming an aqueous cellulosic papermaking furnish (optionally, with mineral fillers, such as calcium carbonates, clays, etc.), draining the furnish to form a sheet, and drying the sheet. It should be appreciated that any suitable furnish may be used. Representative furnishes include, for example, virgin pulp, recycled pulp, kraft pulp (bleached and unbleached), sulfite pulp, mechanical pulp, polymeric plastic fibers, and the like, or any combination of the foregoing pulps. The steps of forming the papermaking furnish, draining and drying may be carried out in any manner generally known to those skilled in the art. In addition, other papermaking additives may be utilized in addition to the polymer treatment of this invention. Such papermaking additives include, for example, retention aids (e.g., microparticles, flocculants, polymeric and inorganic coagulants, etc.), wet and dry strength additives (e.g., cationic starches, polyamidoamine epichlorohydrin-based polymers), the like, and combinations thereof;

"Runnability" means the manner in which a sheet of paper or paper material passes trouble free through the stages and equipment in a papermaking process, as well as any subsequent converting processes such as folding, slitting, cutting, and plying. Complications which interrupt "runnability" include but are not limited to sheet breaks, jamming, clogging, fouling equipment, damaging equipment, and/or requiring more energy to pass the sheet of paper or paper precursor through the equipment;

"Surface strength" means the tendency of a paper substrate to resist damage due to abrasive force;

"Tissue paper" or "tissue product" refers to lightweight paper or an article comprising lightweight paper made using a papermaking process. Non-limiting examples of tissue paper or tissue product include toilet paper, paper towels, napkins, and facial tissues;

"Wet strength" means the tendency of a paper substrate to resist damage due to force(s) when rewet;

"Wet web consistency" refers to the percentage of dry fibers, by weight, in a paper web.

The invention provides methods for improving the dusting and strength properties of a paper product. The present invention is also directed to paper products having improved dusting and strength properties. The methods of the present invention include the application of a polymeric additive to the surface of the paper web during manufacture to produce paper that exhibits low dusting and increased strength. The polymeric additive comprises at least one amine-containing vinylic or allylic monomer. Applicants have surprisingly and unexpectedly discovered that when a polymer comprising an amine-containing vinylic or allylic monomer is applied to a paper web, the resulting paper product exhibits low dusting properties and has increased strength. Preferably, the polymeric additive is applied to at least one surface of the web, and in some embodiments, it is applied to both surfaces of the paper or tissue web. In particular, Applicants have discovered that paper products produced by the present methods exhibit lower lint and dust production when under mechanical stress and have greater wet and dry tensile strength than paper produced in the absence of a polymer comprising an amine-containing vinylic or allylic monomer. The present methods are useful for the manufacture of tissue products because tissue is quite susceptible to dusting and linting issues.

The methods of the present invention employ polymers comprising at least one amine-containing vinylic or allylic monomer, and have been found to improve the properties of a tissue web, and the resulting product. It has also been found that the polymeric additive improves the operation of a papermaking machine in some embodiments. In particular, the methods of the present invention produce tissue products that have a reduced tendency to produce dust. The methods of the present invention also reduce the amount of dust that accumulates on papermaking machinery. For example, a tissue making process employing the present methods has a reduced amount of dust accumulation at equipment such as the creping blade and the Yankee dryer.

Applicants have discovered that application of a polymer comprising at least one amine-containing vinylic or allylic monomer to a tissue web imparts beneficial properties to the resulting tissue sheet. Applicants have surprisingly and unexpectedly discovered that methods of the present invention can actually lead to an increase in tissue strength (e.g., wet and dry tensile strength). As a result, the present invention allows for the use of a lower amount of wet strength additive in the manufacture of tissue products. Without wishing to be bound by any particular theory, it is believed that application of a polymer comprising at least one amine-containing vinylic or allylic monomer to the surface of a tissue web reduces dusting by increasing the surface strength of the tissue.

In an embodiment, the invention provides a method for reducing dust in a tissue making process. The method comprises applying a polymer comprising at least one amine-containing vinylic or allylic monomer to the surface of a tissue web. In certain preferred embodiments, the polymer is applied to the surface of the tissue web prior to drying the tissue web.

The methods of the present invention comprise applying a polymer comprising at least one amine-containing vinylic or allylic monomer to a tissue web. The polymer is applied after formation of the tissue web. The methods of the present invention are in contrast to existing methods which incorporate low dusting additives into paper by adding the additive to paper stock, prior to web formation. For the present invention, the web is formed by depositing or spraying a suspension of papermaking fibers (e.g., aqueous suspension) onto a forming fabric or felt and the polymer is applied to the tissue web. The steps of forming the tissue making furnish (e.g., draining and drying) may be carried out in any manner generally known to those skilled in the art.

A polymer comprising at least one amine-containing vinylic or allylic monomer is applied to the surface of the tissue web using any suitable delivery method. In certain preferred embodiments, the polymer is sprayed onto the surface of the tissue web. In certain embodiments, the polymer is sprayed onto the surface of the tissue web using a spray boom. When a spray boom is used, a spray nozzle or multiple spray nozzles are used to spray the polymer onto the surface of the tissue web. In certain preferred embodiments, the polymer is fed through the spray boom at a rate of about 0.01 to about 0.5 gallons per minute. The polymer is disposed on the tissue web in any amount necessary to impart desired strength and dusting properties. The polymer can be applied to a portion of, or over the entire surface of, the tissue web.

The polymers of the present inventive methods are applied to the paper tissue in any form, including as a water-in-oil emulsion, dry powder, dispersion, or aqueous solution. In certain preferred embodiments, the polymer is applied to the surface of the tissue web as an aqueous solution. In certain preferred embodiments, a polymer comprising at least one amine-containing vinylic or allylic monomer is sprayed onto the surface of a tissue web. In certain preferred embodiments, an aqueous solution of a polymer comprising at least one amine-containing vinylic or allylic monomer is sprayed onto the surface of a tissue web. In certain embodiments, a polymer comprising at least one amine-containing vinylic or allylic monomer is dissolved in a water-soluble solvent and sprayed onto the surface of a tissue web.

The amount of polymer added to the paper web is not limited. In certain embodiments, a polymer comprising at least one amine-containing vinylic or allylic monomer is added to the tissue web in from about 0.05 kg to about 5 kg of dry polymer per ton of dry fiber. Thus, in certain embodiments, a polymer comprising at least one amine-containing vinylic or allylic monomer is added to the tissue web in from about 0.05 kg to about 5 kg of polymer per ton of dry fiber, from about 0.05 kg to about 4 kg of dry polymer per ton of dry fiber, from about 0.05 kg to about 3 kg of dry polymer per ton of dry fiber, from about 0.05 kg to about 2 kg of dry polymer per ton of dry fiber, from about 0.05 kg to about 1 kg of dry polymer per ton of dry fiber, from about 0.5 kg to about 5 kg of dry polymer per ton of dry fiber, or from about 1 kg to about 5 kg of dry polymer per ton of dry fiber. In certain preferred embodiments, a polymer comprising at least one amine-containing vinylic or allylic monomer is added to the tissue web in from about 0.05 kg to about 3 kg of dry polymer per ton of dry fiber.

The polymer can be applied to the surface of the tissue web as a solution having any suitable concentration. In certain embodiments, the polymer is applied to the tissue web as a solution having a concentration of polymer of from about 0.01% to about 10% by weight based on weight of the solution. In certain embodiments, the polymer is applied to the tissue web as a solution having a concentration of polymer of from about 0.01% to about 5% by weight based on weight of the solution.

In certain embodiments, a polymer comprising at least one amine-containing vinylic or allylic monomer is applied to a tissue web having a wet web consistency of from about 5% to about 90%. Thus, in certain embodiments, the polymer comprising at least one amine-containing vinylic or allylic monomer is applied to a tissue web having a wet web consistency of from about 5% to about 90%, from about 5% to about 80%, from about 5% to about 70%, from about 5% to about 60%, from about 5% to about 50%, from about 5% to about 40%, from about 5% to about 30%, from about 5% to about 20%, from about 10% to about 90%, from about 20% to about 90%, from about 30% to about 90%, from about 30% to about 80%, from about 30% to about 70%, from about 30% to about 60%, from about 30% to about 50%, from about 40% to about 90%, from about 40% to about 80%, or from about 40% to about 70%. In certain preferred embodiments, the polymer comprising at least one amine-containing vinylic or allylic monomer is applied to a tissue web having a wet web consistency of from about 5% to about 40%.

A polymer comprising an amine-containing vinylic or allylic monomer is applied to the surface of a tissue web. In certain preferred embodiments, the tissue sheet is creped, e.g., produced on a papermaking machine where a partially dried tissue web is adhered to and dried on a cylinder dryer (e.g., Yankee dryer) and removed by the action of a blade (e.g., creping blade). In certain preferred embodiments, the tissue web is treated with the polymer prior to heating with the drying cylinder (e.g., Yankee dryer) and prior to contact with the blade (e.g., creping blade). For example, the polymer can be applied at, e.g., felts, transfer fabrics, TAD fabrics, belts, and textured belts. In certain preferred embodiments, the tissue web is at least partially dried using a Yankee dryer after the polymer is applied to the tissue web.

Treatment of the tissue web with the polymer prior to contact with the creping blade reduces the amount of dusting that occurs during creping. In certain embodiments, a tissue web that has been surface treated with a polymer comprising at least one amine-containing vinylic or allylic monomer produces less dust at the creping blade as compared to tissue prepared in the absence of such surface treatment.

In certain embodiments, the composition and method of the present invention can be applied to tissue that is uncreped. In certain embodiments, uncreped webs may offer some advantages in surface smoothness as compared to creped paper webs.

The methods of the present invention provide tissue paper having increased strength. In certain embodiments, a method comprising applying a polymer comprising at least one amine-containing vinylic or allylic monomer to at least one surface of a tissue web produces tissue paper having greater wet and dry strength. In certain embodiments, applying a polymer comprising at least one amine-containing vinylic or allylic monomer to the surface of a tissue web provides tissue paper having greater wet strength (e.g., wet tensile) than paper produced in the absence of such surface treatment. In certain embodiments, applying a polymer comprising at least one amine-containing vinylic or allylic monomer to at least one surface of a tissue web provides tissue paper having greater dry strength (e.g., dry tensile) than paper produced in the absence of such surface treatment.

The amine-containing vinylic or allylic monomer is not limited, and can be non-ionic, cationic, anionic, and zwitterionic. In certain embodiments, the polymer used in the present inventive methods is a copolymer. In certain embodiments, the polymer used in the present inventive methods can comprise two or more monomeric species.

Representative non-ionic monomers include acrylamide, methacrylamide, N,N-dimethylacrylamide, N,N-diethylacrylamide, N-isopropylacrylamide, N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, N-t-butylacrylamide, N-methylolacrylamide, vinyl acetate, vinyl alcohol, similar monomers, and combinations thereof.

Representative anionic monomers include acrylic acid and its salts, including, but not limited to sodium acrylate and ammonium acrylate; methacrylic acid and its salts, including, but not limited to sodium methacrylate and ammonium methacrylate; 2-acrylamido-2-methylpropanesulfonic acid ("AMPS"); the sodium salt of AMPS; sodium vinyl sulfonate; styrene sulfonate; maleic acid and its salts, including, but not limited to the sodium salt, the ammonium salt, sulfonate, itaconate, sulfopropyl acrylate or methacrylate or other water-soluble forms of these or other polymerizable carboxylic or sulfonic acids; sulfomethylated acrylamide; allyl sulfonate; sodium vinyl sulfonate; itaconic acid; acrylamidomethylbutanoic acid; fumaric acid; vinylphosphonic acid; vinylsulfonic acid; allylphosphonic acid;

sulfomethylated acrylamide; phosphonomethylated acrylamide; itaconic anhydride; similar monomers, and combinations thereof.

Representative cationic monomers or mer units of the primary or secondary amine include dialkylaminoalkyl acrylates and methacrylates and their quaternary or acid salts, including, but not limited to, dimethylaminoethyl acrylate methyl chloride quaternary salt ("DMAEA•MCQ"), dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride and diallyldimethyl ammonium chloride ("DADMAC"), similar monomers, and combinations thereof.

Representative zwitterionic monomers include N,N-dimethyl-N-acryloyloxyethyl-N-(3-sulfopropyl)-ammonium betaine; N,N-dimethyl-N-acrylamidopropyl-N-(2-carboxymethyl)-ammonium betaine; N,N-dimethyl-N-acrylamidopropyl-N-(3-sulfopropyl)-ammonium betaine; N,N-dimethyl-N-acrylamidopropyl-N-(2-carboxymethyl)-ammonium betaine; 2-(methylthio)ethyl methacryloyl-S-(sulfopropyl)-sulfonium betaine; 2-[(2-acryloylethyl) dimethylammonio]ethyl 2-methyl phosphate; 2-(acryloyloxyethyl)-2'-(trimethylammonium)ethyl phosphate; [(2-acryloylethyl)dimethylammonio]methyl phosphonic acid; 2-methacryloyloxyethyl phosphorylcholine ("MPC"); 2-[(3-acrylamidopropyl)dimethylammonio]ethyl 2'-isopropyl phosphate ("AAPI"); 1-vinyl-3-(3-sulfopropyl) imidazolium hydroxide; (2-acryloxyethyl) carboxymethyl methylsulfonium chloride; 1-(3-sulfopropyl)-2-vinylpyridinium betaine; N-(4-sulfobutyl)-N-methyl-N, N-diallylamine ammonium betaine ("MDABS"); N,N-diallyl-N-methyl-N-(2-sulfoethyl) ammonium betaine; similar monomers, and combinations thereof.

In certain preferred embodiments, the polymer comprises an acrylamide monomer. In certain preferred embodiments, the acrylamide monomer is acrylamide, methacrylamide, N,N-dimethylacrylamide, N,N-diethylacrylamide, N-isopropylacrylamide, N-vinylformamide, N-vinylmethylacetamide, N-vinyl pyrrolidone, N-t-butylacrylamide, N-methylolacrylamide, and combinations thereof. In certain preferred embodiments, the acrylamide monomer is acrylamide.

It should be understood that a polymer in accordance with the present method may include at least one amine-containing vinylic or allylic monomer. In certain preferred embodiments, the polymer is a copolymer formed from a diallylamine monomer and an acrylamide monomer. In certain embodiments, the polymer may consist of diallylamine monomer and acrylamide monomer.

In certain embodiments, the polymer of the present inventive method is a copolymer. In certain preferred embodiments, the polymer is a diallylamine acrylamide copolymer. In certain embodiments, the copolymer comprises at least one diallylamine monomer and at least one acrylamide monomer. In certain preferred embodiments, the polymer comprises diallylamine monomer in an amount of from about 0.01 mol % to about 20 mol %. Thus, in certain embodiments, the polymer comprises diallylamine monomer in an amount of from about 0.01 mol % to about 20 mol %, from about 0.01 mol % to about 15 mol %, from about 0.01 mol % to about 10 mol %, or from about 0.01 mol % to about 5 mol %. In certain preferred embodiments, the polymer comprises acrylamide monomer in an amount of from about 0.01 mol % to about 85 mol %. Thus, in certain embodiments, the polymer comprises acrylamide monomer in an amount of from about 0.01 mol % to about 85 mol %, from about 0.01 mol % to about 80 mol %, from about 0.01 mol % to about 70 mol %, from about 0.01 mol % to about 60 mol %, from about 0.01 mol % to about 50 mol %, or from about 0.01 mol % to about 40 mol %. In certain embodiments, the polymer is a diallylamine acrylamide copolymer comprising from about 1 mol % to about 99 mol % diallylamine monomer. In certain embodiments, the diallylamine acrylamide copolymer comprises diallylamine monomers in an amount greater than acrylamide monomers (e.g., about 60 mol % to about 100 mol % diallylamine monomers). In certain embodiments, the diallylamine acrylamide copolymer comprises from about 10 mol % to about 60 mol % diallylamine monomer. In certain embodiments, the diallylamine acrylamide copolymer comprises about 10 mol % to about 40 mol % diallylamine monomer. In certain embodiments, the diallylamine acrylamide copolymer comprises about 0.1 mol % to about 20 mol % diallylamine monomer.

In certain embodiments, the polymer is a copolymer that comprises an amine-containing allylic monomer and at least one of dimethylaminoethylmethacrylate (DMAEM), dimethylaminoethylacrylate (DMAEA), diethylaminoethyl acrylate (DEAEA), or diethylaminoethyl methacrylate (DEAEM). In certain embodiments, the polymer is a copolymer comprising at least one diallyldimethyl-ammonium chloride monomer (DADMAC).

In certain embodiments, the polymer used in the present methods is a homopolymer. In certain embodiments, the homopolymer is an amine-containing allylic monomer. In certain preferred embodiments, the homopolymer is a diallylamine homopolymer.

In certain embodiments, the polymer is a mixture of polymers comprising at least one amine-containing vinylic or allylic monomer. In certain embodiments, the polymer is a polymer mixture comprising a diallylamine homopolymer. In certain embodiments, the polymer is a polymer mixture comprising a diallylamine acrylamide copolymer. In certain preferred embodiments, the polymer is a mixture of a diallylamine homopolymer and a diallylamine acrylamide copolymer.

The polymer comprising an amine-containing vinylic or allylic monomer can be prepared by any suitable method known in the art. In certain embodiments, the polymer is synthesized using water-in-oil polymerization, dispersion polymerization, gel polymerization, solution polymerization method, or a combination thereof.

In certain embodiments, the polymer comprising at least one amine-containing vinylic or allylic monomer is functionalized with an aldehyde. In certain embodiments, the aldehyde-functionalized polymer is formed by reacting a polymer comprising an amine-containing vinylic or allylic monomer with an aldehyde. In certain embodiments, the aldehyde used to form the aldehyde-functionalized polymer is selected from formaldehyde, paraformaldehyde, glutaraldehyde, glyoxal, and combinations thereof. In certain preferred embodiments, the aldehyde-containing polymer is a glyoxalated polyacrylamide polymer. In certain embodiments, the polymer used in the present inventive methods does not comprise an aldehyde-functionalized polymer.

The polymer used in the present methods can be of any suitable molecular weight. In certain embodiments, the polymer has an average molecular weight of from about 10,000 Daltons to about 5,000,000 Daltons. Thus, in certain embodiments, the polymer has an average molecular weight of from about 10,000 Daltons to about 5,000,000 Daltons, from about 10,000 Daltons to about 4,000,000 Daltons, from about 10,000 Daltons to about 3,000,000 Daltons, from about 10,000 Daltons to about 2,000,000 Daltons, from about 10,000 Daltons to about 1,500,000 Daltons, from about 10,000 Daltons to about 1,000,000 Daltons, from about 10,000 Daltons to about 500,000 Daltons, from about 10,000 Daltons to about 400,000 Daltons, from about 10,000 Daltons to about 300,000 Daltons, from about 10,000 Daltons to about 200,000 Daltons, from about 10,000 Daltons to about 100,000 Daltons, from about 10,000 Daltons to about 50,000 Daltons, from about 100,000 Daltons to about 2,000,000 Daltons, from about 100,000 Daltons to about 1,500,000 Daltons, from about 100,000 Daltons to about 1,000,000 Daltons, from about 100,000 Daltons to about 500,000 Daltons, from about 200,000 Daltons to about 1,500,000 Daltons, from about 200,000 Daltons to about 1,000,000 Daltons, or from about 400,000 Daltons to about 1,250,000 Daltons. In certain preferred embodiments, the polymer has an average molecular weight of from about 200,000 Daltons to about 1,750,000 Daltons. In certain preferred embodiments, the polymer has an average molecular weight of from about 400,000 Daltons to about 1,500,000 Daltons. In certain preferred embodiments, the polymer has an average molecular weight of from about 400,000 Daltons to about 800,000 Daltons. In certain preferred embodiments, the polymer has an average molecular weight of from about 1,000,000 Daltons to about 1,750,000 Daltons. In certain embodiments, the polymer is highly charged (e.g., comprises about 20% or more amine-containing allylic monomer) and has an average molecular weight of from about 400,000 Daltons to about 800,000 Daltons. In certain embodiments, the polymer has a low charge (e.g., comprises about 0.01% to about 20% amine-containing allylic monomer) and has an average molecular weight of from about 800,000 Daltons to about 1,750,000 Daltons.

In certain embodiments, the papermaking methods of the present invention may optionally include one or more materials that are cationic in nature or capable of ionizing or dissociating in such a manner as to produce one or more cations or other positively charged moieties. Such cationic agents have been found useful as a means for aiding in the retention of fiber, fines, and filler in paper, and those of skill in the art commonly refer to these as retention agents, aids, packages, and the like. Other cationic agents include, for example, cationic starch derivatives, including primary, secondary, tertiary, or quaternary amine starch derivatives and other cationic nitrogen substituted starch derivatives. Such derivatives may be prepared from all types of starches including corn, tapioca, potato, waxy maize, wheat, and rice. Moreover, they may be in their original granule form or they may be converted to pre-gelatinized, cold water soluble products and/or employed in liquid form. In certain embodiments, the papermaking methods of the present invention may include flocculants, coagulants, microparticles, or combinations thereof.

Other additives may be used in conjunction with the present invention. Additional agents include wet strength aids, dry strength aids, debonding agents, softening agents, adhesive chemicals, sizing agents, dyes, optical brighteners, absorbency aids, and the like. Other additives include odor control materials and deodorants, pigments, humectants, emollients, bactericides, buffers, waxes, zeolites, lotions, perfumes, vegetable and mineral oils, superabsorbents, surfactants, fungicides, moisturizers, and the like.

The wood pulp source used to produce the papermaking fibers is not limited. For example, hardwood and softwood pulps and a combination thereof can be used as a source of papermaking fibers for the tissue webs of the present invention. Useful wood pulps include chemical pulps such as sulfite and sulfate pulps (e.g., Kraft pulp) as well as mechanical pulps including ground wood, ThermoMechanical Pulp, and Chemi-ThermoMechanical Pulp. Papermaking fibers derived from recycled paper can also be used with the present invention. In certain embodiments, the papermaking fibers are virgin chemical wood pulps.

In another embodiment, a low dust tissue product comprises cellulosic fibers and a polymer comprising at least one amine-containing vinylic or allylic monomer, where the polymer is disposed on at least one surface of the tissue product.

The polymer in the low dust tissue product is the same as the polymer applied to the tissue web, as described above. By way of example, and not in limitation, in certain embodiments, the polymer comprises an acrylamide monomer. In certain embodiments, the polymer comprises a diallylamine monomer. In certain embodiments, the polymer is a diallylamine homopolymer. In certain embodiments, the polymer is a mixture of diallylamine homopolymer and diallylamine acrylamide copolymer. In certain preferred embodiments, the polymer is a diallylamine acrylamide copolymer. In certain embodiments, the diallylamine acrylamide copolymer comprises diallylamine monomer in an amount greater than acrylamide monomer. In certain embodiments, the diallylamine acrylamide copolymer comprises from about 10 to about 60 mole percent diallylamine monomer. In certain preferred embodiments, the diallylamine acrylamide copolymer comprises about 5 to about 40 mole percent diallylamine monomer.

In certain preferred embodiments, the tissue product is formed by applying the polymer to a surface of the tissue web. In certain embodiments, a polymer comprising at least one amine-containing vinylic or allylic monomer is added to the tissue web in from about 0.05 kg to about 5 kg of dry polymer per ton of tissue product. Thus, in certain embodiments, a polymer comprising at least one amine-containing vinylic or allylic monomer is added to the tissue web in from about 0.05 kg to about 5 kg of dry polymer per ton of tissue product, from about 0.05 kg to about 4 kg of dry polymer per ton of tissue product, from about 0.05 kg to about 3 kg of dry polymer per ton of tissue product, from about 0.05 kg to about 2 kg of dry polymer per ton of tissue product, from about 0.05 kg to about 1 kg of dry polymer per ton of tissue product, from about 0.5 kg to about 5 kg of dry polymer per ton of tissue product, or from about 1 kg to about 5 kg of dry polymer per ton of tissue product. In certain preferred embodiments, a polymer comprising at least one amine-containing vinylic or allylic monomer is added to the tissue web in from about 0.05 kg to about 3 kg of dry polymer per ton of tissue product.

In certain embodiments, the tissue product comprises a tissue sheet having a weight of from about 5 g/m² to about 40 g/m². In certain embodiments, the tissue product comprises a tissue sheet having a weight of from about 5 g/m² to about 20 g/m². In certain embodiments, the tissue product comprises a tissue sheet having a weight of from about 10 g/m² to about 30 g/m².

In certain embodiments, the polymer comprising at least one amine-containing vinylic or allylic monomer is disposed on two surfaces of the tissue product.

The tissue product of the present invention is single-layered or multi-layered. The tissue product can be a single-ply tissue paper in which the web forming the tissue is stratified, i.e., has multiple layers, or a multi-ply tissue product in which the webs forming the multi-ply tissue product may be either single or multi-layered. It should be understood that the tissue paper can include any number of plies or layers. In certain embodiments, a polymer comprising an amine-containing vinylic or allylic monomer is applied to the top layer of the tissue, or to the layer that will ultimately become the top layer of the tissue. In certain embodiments, the polymer may also be applied to the outer layer of a multi-layer tissue.

The tissue product can be any article which comprises tissue paper. In certain embodiments, the tissue product is bathroom tissue, facial tissue, napkin, or an absorbent towel (e.g., paper towels).

The following examples further illustrate the invention but, of course, should not be construed as in any way limiting its scope.

Example 1

This Example illustrates dust generated from tissue produced using a method in accordance with an embodiment of the invention.

A 17.6 g/m² premium facial tissue sheet on a crescent former tissue making machine was treated with a diallylamine acrylamide copolymer by spraying the polymer on the surface of the tissue web. The tissue web was formed from a fiber stock slurry having a consistency of 0.08%. The web had a two-layer construction consisting of a 55/45 (wt/wt) fiber split. The fiber in the 55 wt % layer consisted of 100% *Eucalyptus* fibers and the fiber in the 45 wt % layer consisted of 90% softwood and 10% machine broke. The diallylamine acrylamide copolymer was prepared by mixing the polymer with water to obtain an aqueous solution having a concentration of 0.5% (V/V). The diallylamine acrylamide had a molecular weight of about 1,000,000 Daltons and consisted of 15 mol % diallylamine and 85 mol % acrylamide (equivalent to a charge density of about 2 meq/g). The diallylamine acrylamide solution was fed through the spray boom at an application rate of 0.38 pound of dry product to dry ton of fiber in the tissue web. The diallylamine acrylamide polymer solution was sprayed on the sheet side of the felt (*Eucalyptus* layer), just after the sheet transfer roll. The web consistency at this point in the process is approximately 10% and the web speed was 884 m/min. The apparatus for applying the dust reduction agent was a spray boom consisting of a 1 inch diameter pipe having a total length of 198 inches. Twenty-one spray nozzles were spaced 8 inches apart along the pipe to apply the diallylamine acrylamide copolymer over the 169 inch width of the tissue sheet. The nozzle spray angles were 110 degrees and each delivered 0.1 gallons per minute at the 40 psi boom pressure. The tissue sheet was dried using a Yankee dryer and subjected to a creping process using a flexible creping blade. The tissue sheet moisture at the finished reel was 4.4%. For each sample, dust was collected for a time period of one hour by placing a 9 inch×13 inch pan underneath the creping blade. The amount of dusting at the creping blade was measured gravimetrically. The collected dust was weighed and recorded.

Figure 1:
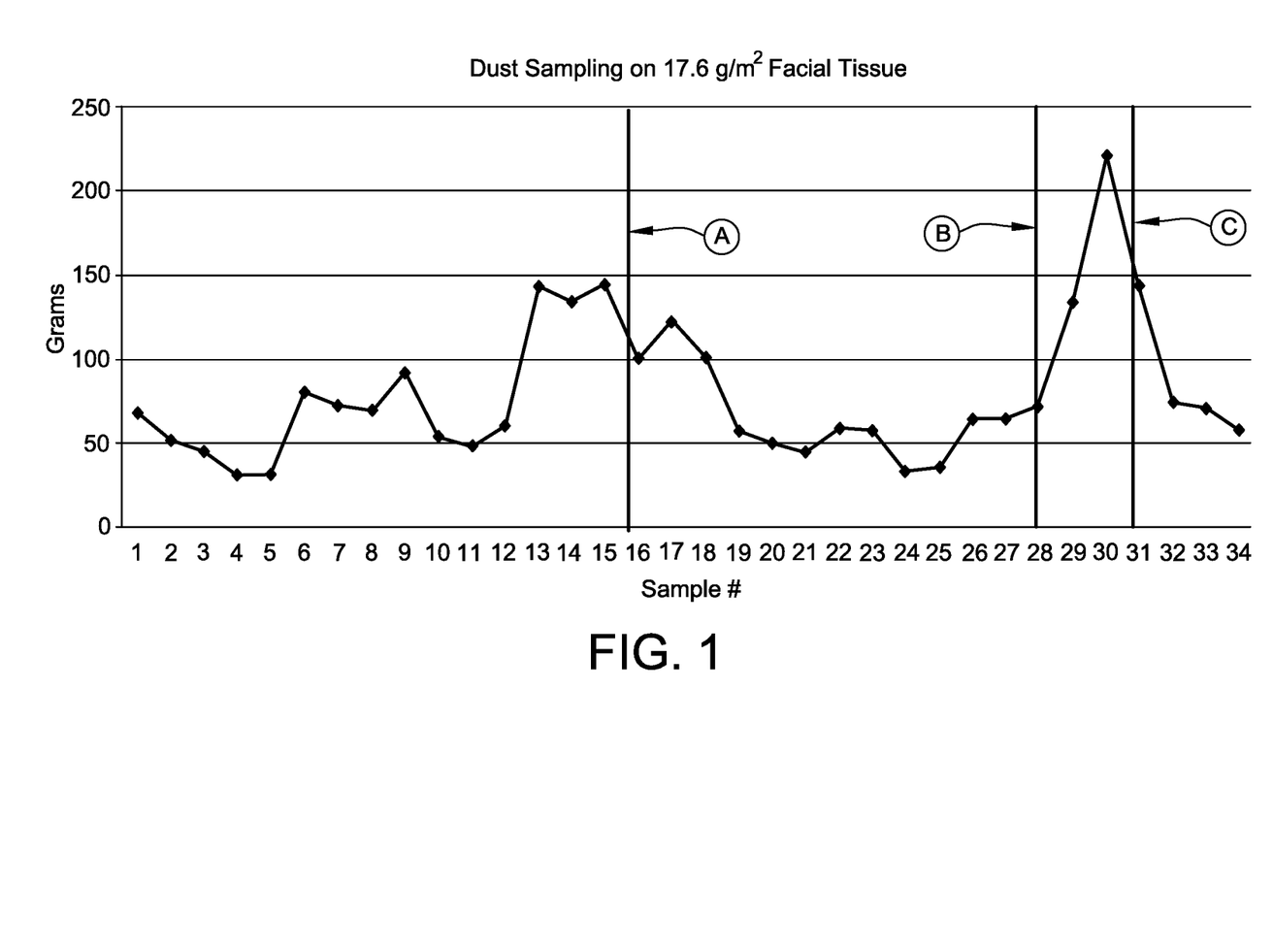
FIG. 1 is a line graph that illustrates the amount of dust collected at the creping blade of a tissue making process when a diallylamine/acrylamide copolymer is applied to a tissue web.

The anti-dusting effect of applying diallylamine acrylamide copolymer to the surface of a tissue web was evaluated through paper machine trials. The amount of dust collected at the creping blade during the trial is shown at FIG. 1, where the sample number is plotted along the horizontal axis and the amount of dust collected at the creping blade is plotted along the vertical axis. For samples 1-15, there was no diallylamine acrylamide copolymer added to the tissue web. The copolymer is added prior to analysis of sample 16 (see A in FIG. 1). At sample 28, the application rate of the copolymer is reduced from about 0.38 lb/ton to about 0.20 lb/ton (see B in FIG. 1). Prior to sample 31, the amount of copolymer is increased from 0.20 lb/ton to about 0.38 lb/ton (see C in FIG. 1). As shown in FIG. 1, the amount of dust collected from the creping blade when the polymeric treatment was applied to the tissue web was from about 20% to 50% less than was collected for tissue prepared in the absence of diallylamine acrylamide copolymer treatment (e.g., sample 15 vs. sample 24). Applicants also observed a reduction in the amount of wet strength additive required to maintain strength. Wet strength additive usage remained very low, averaging about 1.8 gallons per hour.

Example 2

This Example illustrates the dusting and strength properties of a tissue sheet produced using a method in accordance with an embodiment of the invention.

A 17.6 g/m² premium facial tissue sheet on a crescent former tissue making machine was treated with a diallylamine acrylamide copolymer and subjected to creping in the same manner as the tissue sheet of Example 1. The diallylamine acrylamide copolymer was the same as the copolymer used in Example 1. After the tissue sheet was sprayed with diallylamine acrylamide copolymer, the dust generated during the creping process was measured as done in Example 1. The amount of wet strength additive added to the furnish was also recorded. In addition, the dry and wet tensile strength of the tissue was measured. Dry and wet tensile tests were conducted in a conditioned temperature and humidity room in general accordance with TAPPI standards (e.g., T450 om-03, T494 om-06, and T576 pm-07). The tissue test specimens were 1 inch wide. For wet tensile tests, the strips were wetted in the middle of the span with a brush.

Figure 2:
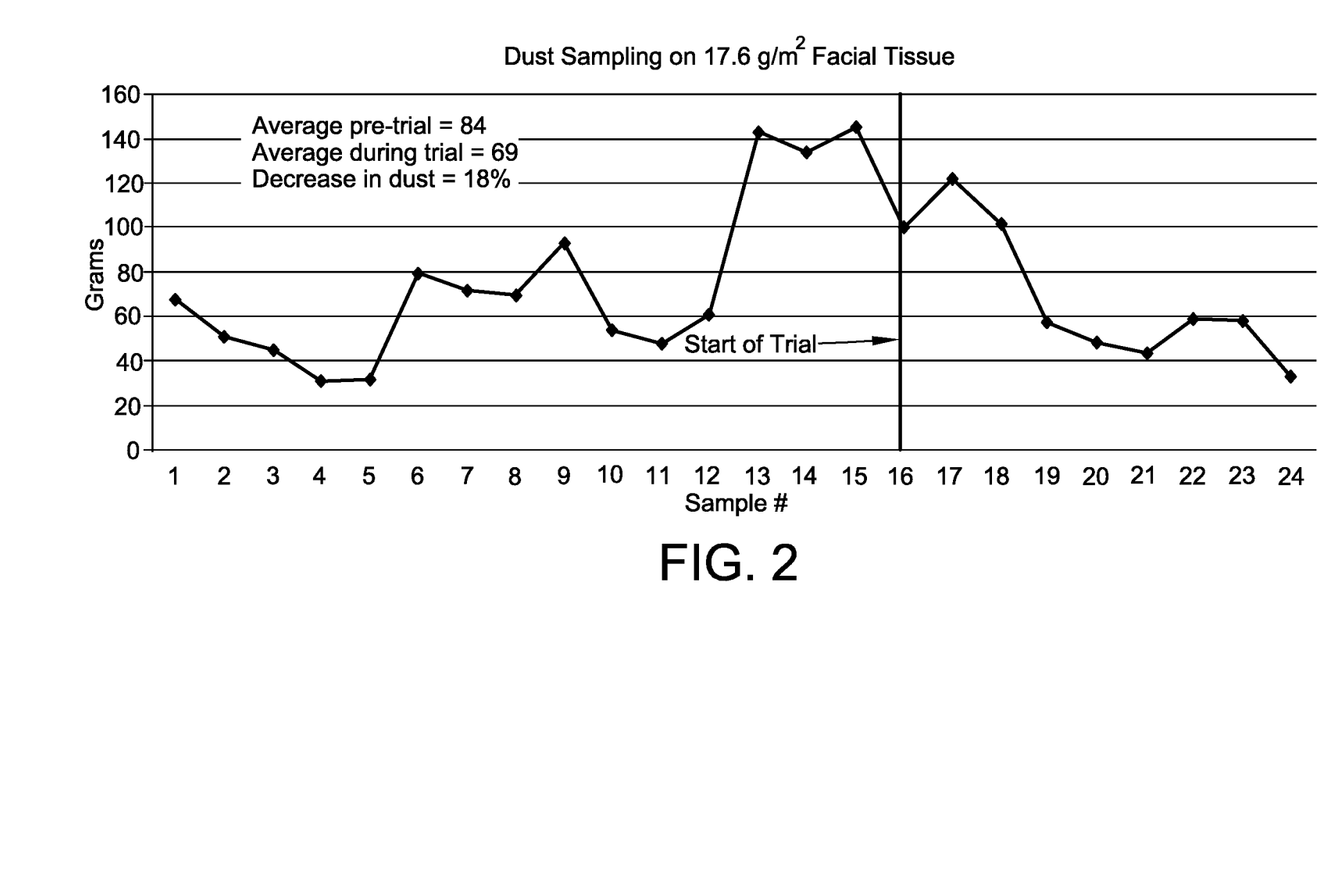
FIG. 2 is a line graph that illustrates the amount of dust collected at the creping blade of a tissue making process when a diallylamine/acrylamide copolymer is applied to a tissue web.
Figure 3:
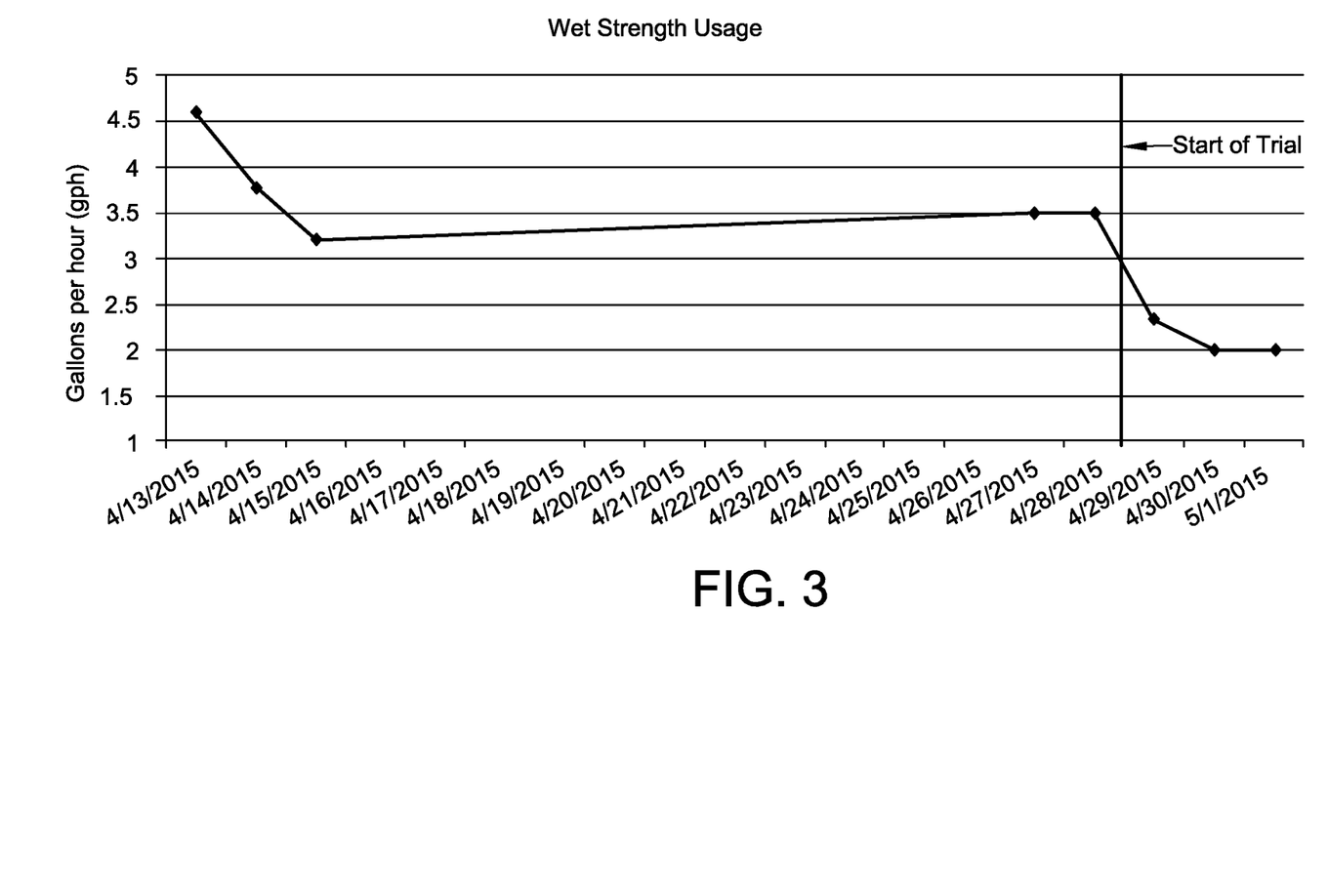
FIG. 3 is a line graph that illustrates the wet strength additive dosage in a tissue papermaking process when a diallylamine/acrylamide copolymer is applied to a tissue web.
Figure 4:
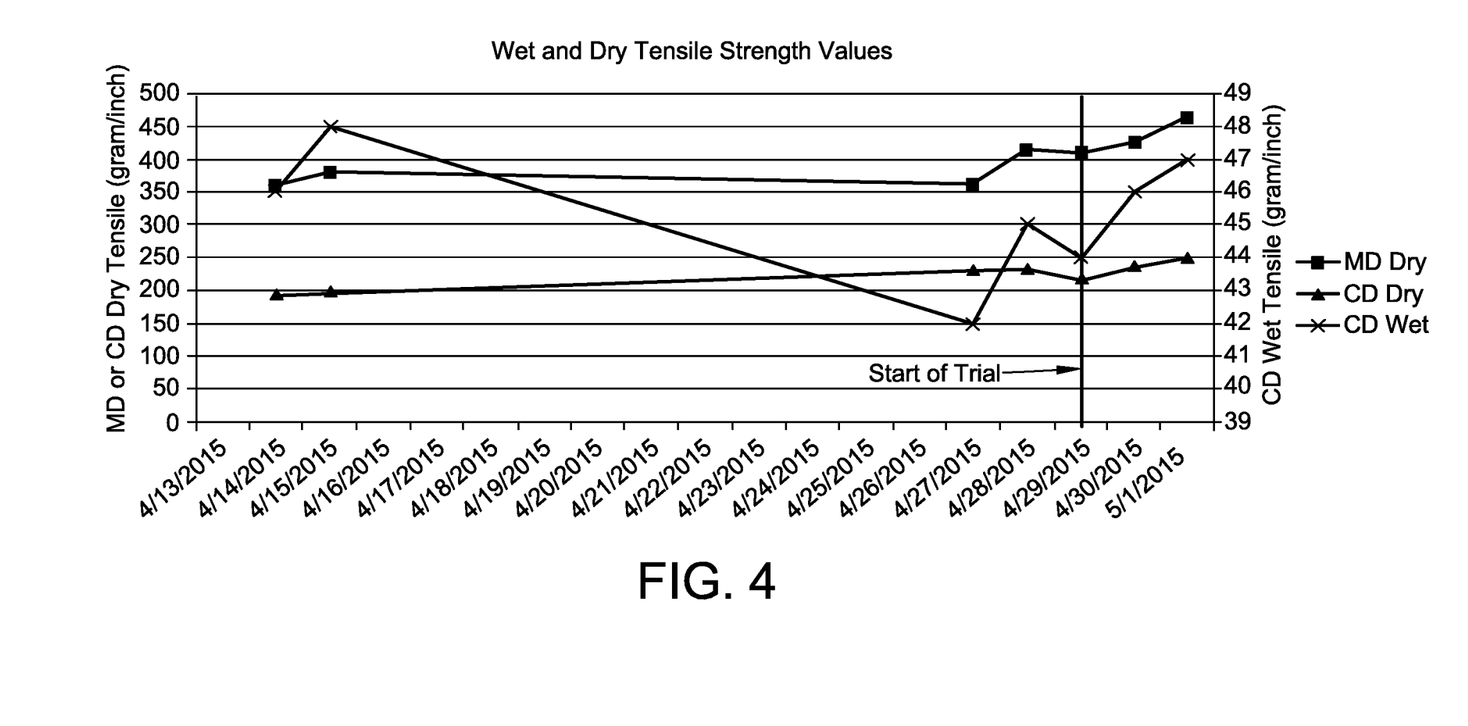
FIG. 4 is a line graph that illustrates the wet and dry tensile strengths of a tissue sheet in a tissue making process when a diallylamine/acrylamide copolymer is applied to a tissue web.

The effect of applying a diallylamine acrylamide copolymer to a tissue web on dusting, wet strength additive dosage, and tensile strength was evaluated through a paper machine trial shown in FIGS. 2-4. "Start of Trial" refers to the point at which the diallylamine acrylamide is applied to the tissue web. The anti-dusting effect of applying a diallylamine acrylamide copolymer to a tissue web is shown in FIG. 2, where the sample number is plotted along the horizontal axis and the amount of dust collected at the creping blade is plotted along the vertical axis. As shown in FIG. 2, the amount of dust collected from the creping blade when the polymeric treatment was applied to the tissue web was less than the amount of dust collected from tissue prepared in the absence of diallylamine acrylamide polymer treatment. The average amount of dust collected prior to adding diallylamine acrylamide copolymer to the tissue web was 84 grams, while the average dust collected after adding diallylamine acrylamide copolymer to the tissue web was 69 grams, resulting in 18% overall dust reduction.

The effect of application of a diallylamine acrylamide copolymer to a tissue web on wet strength additive dosage in a tissue making process was also evaluated during the same trial. FIG. 3 shows the effect of diallylamine acrylamide copolymer on the amount of wet strength additive dosed into the furnish to maintain sufficient tissue strength, where time is plotted along the horizontal axis and the amount of wet strength additive added to the furnish is plotted along the vertical axis. As shown in FIG. 3, the amount of wet strength additive needed to maintain sufficient tissue wet strength decreased when the diallylamine acrylamide copolymer was added to the tissue web.

The effect of application of a diallylamine acrylamide copolymer to a tissue web on wet tensile strength and dry tensile strength was evaluated as shown in FIG. 4, where time is plotted along the horizontal axis and dry tensile strength and wet tensile strength are plotted along the left vertical axis and right vertical axis, respectively. Table 1 shows tensile strength data and wet strength additive dosage for the final data point of the trial shown in FIGS. 3 and 4.

Table 1 shows that the wet and dry tensile strength of the tissue increased with addition of diallylamine acrylamide copolymer to the tissue web in accordance with an embodiment of the invention. As shown in Table 1, the MD dry strength was 408 g/in prior to adding diallylamine acrylamide copolymer to the tissue web (see Pre-trial data). After application of the diallylamine acrylamide copolymer to the tissue web, the MD dry tensile strength increased to 463 W/in (see Trial data). Similarly, CD dry tensile strength and CD wet tensile strength increased when the tissue web was treated with diallylamine acrylamide copolymer. The data of FIG. 4 and Table 1 demonstrates that the wet and dry tensile strength of a tissue web increased after treatment of the tissue web with a diallylamine acrylamide copolymer in accordance with an embodiment of the invention. Of particular note, the wet tensile strength of the tissue remained higher than the control even though the amount of wet strength resin added to the furnish was reduced by 43% (i.e., from 3.5 gph to about 2.0 gph).

TABLE I

Trial Data—Effect of Application of Diallylamine Acrylamide Copolymer to Tissue Web

| | Wet Strength Resin Dosage (grams per hour) | MD Dry Tensile Strength (g/in.) | CD Dry Tensile Strength (g/in.) | CD Wet Tensile Strength (g/in.) |
|---|---|---|---|---|
| Pre-trial | 3.5 | 408 | 216 | 44 |
| Trial | 2.0 | 463 | 250 | 47 |
| % change | −43 | +13.5 | +15.7 | +6.8 |

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for reducing dust in a tissue making process comprising: applying a polymer comprising at least one amine-containing vinylic or allylic monomer to the surface of a tissue web, wherein the polymer does not comprise an aldehyde-functionalized polymer.

2. The method of claim 1, wherein the polymer is applied by spraying onto a surface of the tissue web.

3. The method of claim 2, wherein the polymer is applied by spraying onto the surface of the tissue web utilizing a spray boom.

4. The method of claim 1, wherein the polymer is applied prior to drying the tissue web.

5. The method of claim 1, wherein the tissue web is at least partially dried after the polymer is applied to the tissue web.

6. The method of claim 1, wherein the tissue web has a wet web consistency of from about 5% to about 40%.

7. The method of claim 1, wherein the polymer is a diallylamine acrylamide copolymer.

8. The method of claim 1, wherein the polymer is applied in combination with a diallylamine homopolymer.

9. The method of claim 1, wherein the polymer comprises about 0.1 mol % to about 20 mol % diallylamine monomer.

10. The method of claim 1, wherein the polymer has an average molecular weight of from about 200,000 Daltons to about 1,500,000 Daltons.

11. The method of claim 1, wherein the polymer is applied to the surface of the tissue web as a solution having a concentration of from about 0.01% to about 10% by weight of the polymer based on the weight of the solution.

* * * * *